United States Patent
Narayanan et al.

(10) Patent No.: US 8,913,721 B1
(45) Date of Patent: *Dec. 16, 2014

(54) SYSTEMS AND METHODS FOR PREVENTING SENSITIVE INFORMATION FROM BEING COMMUNICATED INTO A NON-SECURE ENVIRONMENT

(75) Inventors: Anantha Narayanan, Plano, TX (US); Ellis K. Cave, Plano, TX (US); Bogdan Blaszczak, Coppell, TX (US); Justin Broughton, Mountain View, CA (US); Mohan Rangarajan, Plano, TX (US)

(73) Assignee: Intervoice Limited Partnership, Las Vegas, NV (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/476,456

(22) Filed: May 21, 2012

Related U.S. Application Data

(63) Continuation of application No. 12/188,926, filed on Aug. 8, 2008, now Pat. No. 8,204,180.

(51) Int. Cl.
  *H04M 1/64* (2006.01)
  *G06F 21/00* (2013.01)
  *H04L 9/00* (2006.01)

(52) U.S. Cl.
  USPC .................. 379/88.04; 345/626; 348/14.01; 370/352; 370/401; 370/469; 379/88.19; 379/142.02; 379/220.01; 379/265.02; 380/44; 455/411; 704/275; 705/1.1; 707/694; 709/208; 709/224; 709/225; 713/150; 713/164; 713/183; 713/186; 713/193; 715/741; 726/1; 726/5; 726/25; 726/26; 726/27

(58) Field of Classification Search
  CPC ................... H04M 2203/6009; H04M 3/51
  USPC ............ 348/14.01; 379/88.04, 88.19, 142.02, 379/220.01, 265.02; 713/150, 183, 164, 713/167, 186, 193; 726/27, 1, 5, 25, 26; 345/626; 370/352, 401, 469; 376/352; 380/44; 455/411; 704/275; 705/1.1; 707/694; 709/208, 224, 225; 715/741
  See application file for complete search history.

(56) References Cited

U.S. PATENT DOCUMENTS

| | | | |
|---|---|---|---|
| 5,177,785 A | 1/1993 | Itani et al. | |
| 5,930,792 A | 7/1999 | Polcyn | |
| 6,044,349 A * | 3/2000 | Tolopka et al. | 705/1.1 |
| 6,092,202 A * | 7/2000 | Veil et al. | 726/27 |
| 6,178,443 B1 * | 1/2001 | Lin | 709/208 |
| 6,418,440 B1 * | 7/2002 | Kuo et al. | 1/1 |
| 6,829,613 B1 * | 12/2004 | Liddy | 707/694 |
| 7,058,968 B2 | 6/2006 | Rowland et al. | |
| 7,197,463 B2 * | 3/2007 | Kotzin | 704/275 |
| 7,216,236 B2 * | 5/2007 | Kou et al. | 713/183 |
| 7,249,266 B2 * | 7/2007 | Margalit et al. | 713/193 |

(Continued)

*Primary Examiner* — Gerald Gauthier
(74) *Attorney, Agent, or Firm* — Crowe & Dunlevy

(57) ABSTRACT

A telecommunication system is arranged between a trusted automated interactive system and a non-secure agent. The trusted automated interactive portion is operable for bidirectional communications with a caller. The agent portion is arranged to be bridged onto a communication connection between the caller (or network chat user) and the trusted interactive system under certain conditions. Sensitive data transmitted between the system and a calling user may be blocked from being communicated to the agent even while the agent is bridged onto the connection. In one embodiment, information (such as a verification of authenticity of the caller) pertaining to the sensitive data (but not the sensitive data itself) is communicated to the agent.

15 Claims, 4 Drawing Sheets

(56) References Cited

U.S. PATENT DOCUMENTS

| | | | |
|---|---|---|---|
| 7,490,356 B2 * | 2/2009 | Lieblich et al. | 726/25 |
| 7,552,467 B2 * | 6/2009 | Lindsay | 726/5 |
| 7,555,092 B2 | 6/2009 | Russell, II et al. | |
| 7,568,001 B2 | 7/2009 | McPartlin et al. | |
| 7,623,149 B2 * | 11/2009 | Winegard | 348/14.01 |
| 7,714,878 B2 | 5/2010 | Gabay et al. | |
| 7,822,065 B2 * | 10/2010 | Lu | 370/469 |
| 7,861,081 B2 | 12/2010 | Yeap et al. | |
| 7,865,958 B2 * | 1/2011 | Lieblich et al. | 726/25 |
| 7,917,750 B2 * | 3/2011 | Novoa et al. | 713/164 |
| 7,949,759 B2 | 5/2011 | Appelman | |
| 7,949,867 B2 * | 5/2011 | Deshpande et al. | 713/150 |
| 7,949,869 B2 | 5/2011 | Deshpande et al. | |
| 8,096,809 B2 | 1/2012 | Burgin et al. | |
| 8,135,383 B2 | 3/2012 | Bickerstaff et al. | |
| 8,140,664 B2 * | 3/2012 | Huang et al. | 709/224 |
| 8,190,908 B2 | 5/2012 | Jazayeri et al. | |
| 8,204,180 B1 * | 6/2012 | Narayanan et al. | 379/88.04 |
| 8,275,115 B1 * | 9/2012 | Everingham et al. | 379/265.02 |
| 8,649,386 B2 * | 2/2014 | Ansari et al. | 370/401 |
| 2003/0028537 A1 | 2/2003 | Nakamura et al. | |
| 2008/0005325 A1 | 1/2008 | Wynn et al. | |
| 2008/0034354 A1 | 2/2008 | Brughton | |
| 2009/0265638 A1 | 10/2009 | Carapelli et al. | |
| 2010/0031365 A1 | 2/2010 | Krishnamurthy et al. | |

\* cited by examiner

SYSTEMS AND METHODS FOR PREVENTING SENSITIVE INFORMATION FROM BEING COMMUNICATED INTO A NON-SECURE ENVIRONMENT

CROSS REFERENCE TO RELATED APPLICATIONS

This application claims priority from, and is a continuation of, U.S. patent application Ser. No. 12/188,926, filed Aug. 8, 2008, with the same inventors and title as the present application. The disclosure of that application is hereby incorporated by reference in its entirety.

TECHNICAL FIELD

This disclosure relates to communication systems and specifically to systems and methods for preventing sensitive information in a call distribution system from being communicated into a non-secure environment.

BACKGROUND OF THE INVENTION

In many situations, for example, when a person interacts with an Interactive Voice Recognition (IVR) system, or when a person interacts with an agent during an on-line chat session, it is necessary to give an agent sensitive information. The delivery of such information under these circumstances is not ideal and can cause concern for the system user.

In the IVR situation, traditional call centers employ agents to answer incoming calls from users. The agents are arranged into one or more groups and the incoming calls are automatically distributed to each of the agents following well-known algorithms for such incoming call distribution. Such systems are known as automatic call distribution (ACD) systems.

In many situations, the actual incoming call is directed to an IVR which is essentially an automatic (robotic) system that initiates a dialog with the caller in an attempt to determine and, if possible, respond to, the caller's requirements The IVR is designed to attempt to satisfy as much of the caller's agenda as possible with the goal being to avoid involving a live agent to the extent possible. These systems are well-known and operate to significantly reduce per-call costs.

When the IVR is unable to satisfy the caller's requirements the incoming all then enters the ACD system and is placed in a queue waiting for the next available agent. Information collected in the IVR can be used to route the caller to an agent with appropriate skills to interact with the caller. When the caller is connected to the agent, the agent converses with the caller in an attempt to resolve any remaining issues. When all the remaining issues are settled, the agent disconnects the call.

During the conversation between the calling user and the agent, the agent often must perform a task for the caller, such as charging a credit card, or accessing a specific record. This process may require that the caller reveal sensitive information to the agent, such as a credit card number, a social security number, birthdates, passwords, addresses, phone numbers, email addresses, etc. Typically, this sensitive information is used by the agent to help resolve an issue, such as the identity of the calling user, or the identity of a document. Some calling users are concerned about the exposure of such information to a person (the agent) that they do not know and who often is located in a country foreign to where the calling user is located. Since privacy concerns may not be uniform around the world, calling users are justified in their concern.

The outsourcing of call center and even chat-room agents to foreign countries has greatly exacerbated the security problem. Using modern networking technologies, call centers are able to locate agents in locations where labor costs are lower. In these scenarios, it becomes difficult to control the exposure of private information. Certain types of applications can run afoul of various privacy, such as HIPPA in the US and the EDDP (European Directive on Data Protection) in the EU.

BRIEF SUMMARY OF THE INVENTION

A telecommunication system is arranged between a trusted automated interactive system and a non-secure agent. The trusted automated interactive portion is operable for bidirectional communications with a caller. The agent portion is arranged to be bridged onto a communication connection between the caller (or network chat user) and the trusted interactive system under certain conditions. Sensitive data transmitted between the system and a calling user may be blocked from being communicated to the agent even while the agent is bridged onto the connection. In one embodiment, information (such as a verification of authenticity of the caller) pertaining to the sensitive data (but not the sensitive data itself) is communicated to the agent.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
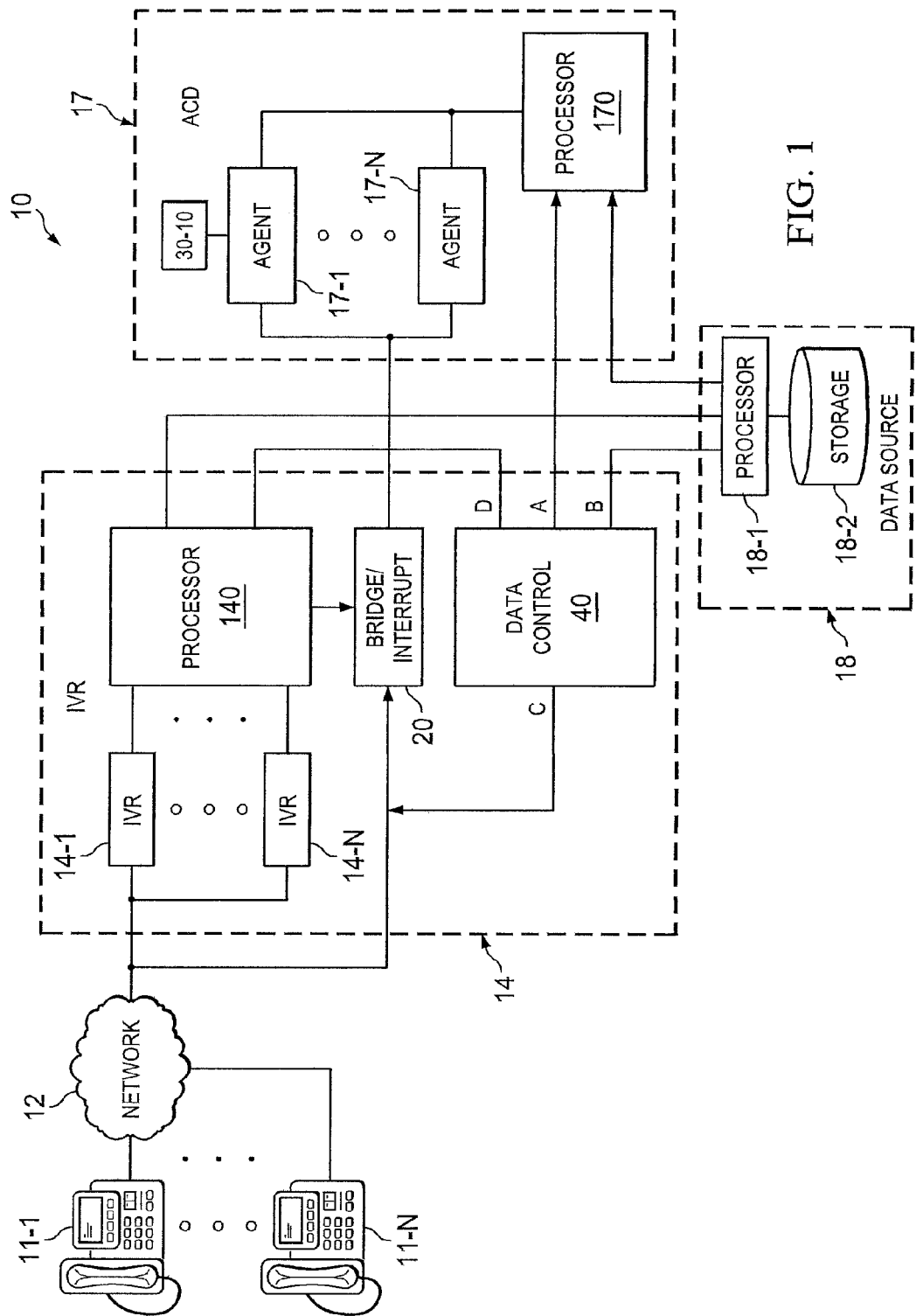
FIG. 1 shows one embodiment of a block diagram of a telecommunication system using the concepts of the invention.

FIG. 1 shows one embodiment of a block diagram of telecommunication system 10 using the concepts of the invention. Calling user 11-1, desiring to obtain some information from a data source, such as source 18, dials the appropriate telephone number and the call is routed, as is well-known, via network 12 to an IVR system, such as IVR system 14, associated with the called number. The data source can be a bank, an airline, a merchant selling products or services, etc. The data source can contain banking information, airline reservations, merchandise codes, etc. Note that system 10 can be thought of as an IVR system, an ACD distribution system, a telecommunications answering system or simply a call center.

In operation, the incoming call to IVR 14 is assigned an available one of the IVR devices 14-1 to 14-N. The assigned IVR then processes the incoming call as is well-known, by a series of outward voice prompts to the calling user. The calling user, in response to a voice prompt, replies, either by voice or by DTMF signaling. The connected IVR device then passes the response to a processing unit(s), such as to processor 140, to decode the caller's response. If data is requested, and after a proper verification of identity, PIN number, etc., the IVR interacts with data source 18 under control of processors 140 and 18-1 and storage 18-2.

If the IVR device is unable to satisfy all of the caller's issues, the IVR places a call to the call center's ACD, such as to ACD 17. Note that ACD 17, or at least a portion of the ACD, may be located physically remote from the IVR system. As discussed above, the IVR portion and the agent portion can even be in a different countries.

In a typical call center, when the ACD answers, the IVR would transfer the call to the ACD and drop off the line. This would be accomplished, for example, by bridge circuit 20 or by processor 140 establishing a new connection. At this point, the IVR device would become removed from the call, and the IVR port would be free to take a new call. Meanwhile, ACD 17, under control of, for example processor 170, would place the caller on hold, and would queue the caller waiting for an available human agent, selected from agents 17-1 to 17-N. When an agent, such as agent 17-1, is available, the ACD would connect the caller to the selected available agent.

In one embodiment, at this point, instead of transferring the caller to the ACD system, the IVR conferences the ACD system into the call. Thus, the IVR remains on the calling connection essentially in parallel with the ACD. Bridge circuit 20 can control such a conference connection. By remaining on the call, the IVR maintains control of the conference bridge, and thus remains on the call's audio path, for the duration of the call. The IVR can then monitor the full conversation between the caller and the agent, and, as will be discussed in more detail, mute or block the audio from the caller to the agent when required.

When the IVR determines that the caller must talk to a live agent, the IVR informs the caller that the caller will be connected to the next available agent. However, in one embodiment, as will be discussed with respect to FIG. 5 before connecting to the agent, the IVR can instruct the caller that any sensitive information required by the agent should be entered using their Touch-Tone (DTMF) keypad, instead of speaking the information to the agent. This can be explained as a security measure. The caller can also be instructed by the IVR that the agent will not be able to hear any data entry.

Figure 3:
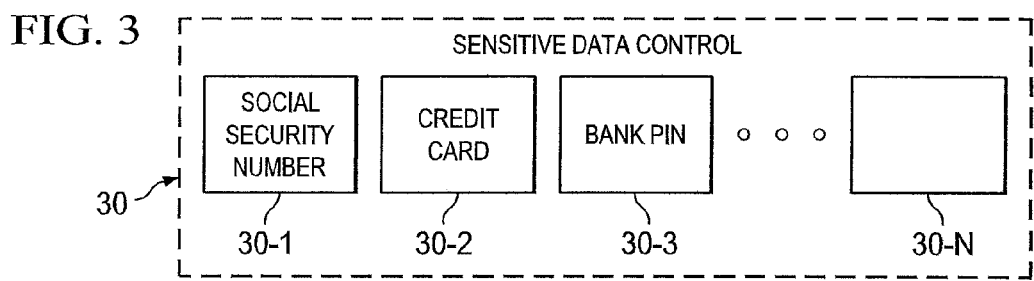

In one embodiment, the agent has a set of buttons, such as button set 30, representing the various sensitive data entries that may be required during the call. As shown in FIG. 3, if during the call the agent (or the non-secure portion of the system) needs to have the calling user provide sensitive information for any purpose the agent, in one embodiment, operates the button corresponding to the desired sensitive information. For example, if the user's social security number is required, button 30-1 is enabled. If credit card information is required then button 30-2 is enabled. Likewise for any other buttons 30-3 to 30-N. Note that button set is shown as a separate device but can be incorporated on the agents screen as, for example, soft keys. Also, the agent could simply spell out the desired information on a key pad. The data from the operation of the sensitive key would trigger the still connected IVR. The IVR in turn would mute the voice line between the calling user and agent while maintaining a communication connection between the IVR and the calling user and also while maintaining the agent active with respect to this same calling user. The IVR now acts as the trusted agent and prepares to validate the sensitive information provided by the calling user.

Figure 2:
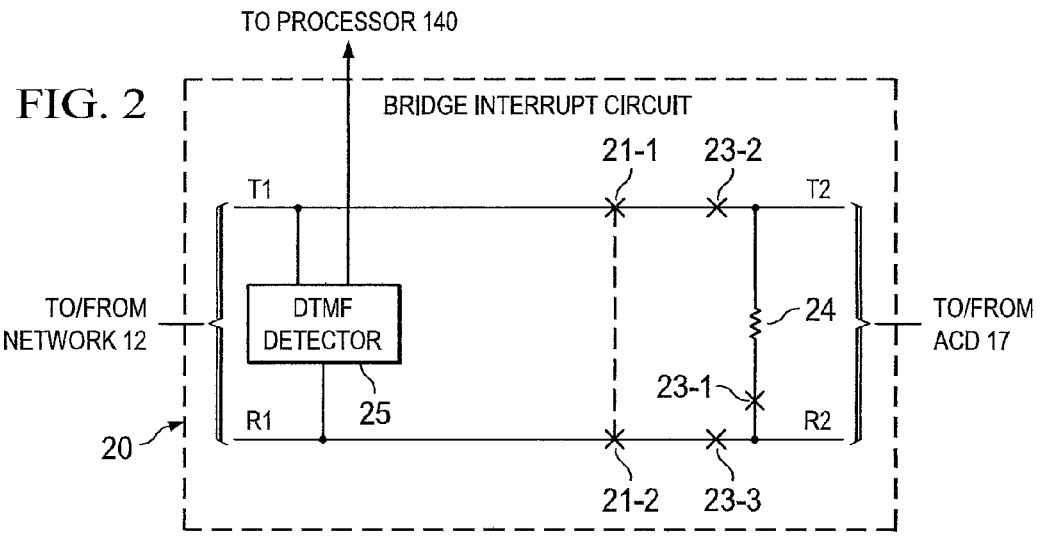
FIGS. 2, 3 and 4 show embodiments of control circuitry used in the system shown in FIG. 1.

FIG. 2 shows one embodiment of mute or interrupt circuit 20 in which the closure of switches 21-1, 21-2 enables the voice connection between the calling user network connection (T1, R1) and ACD 17 (lines T2, R2) while the closure of switch 23-1 places impedance 24 across the T2, R2 leads to the ACD. The concurrent opening of switches 23-1, 23-3 separates the IVR from the ACD during the muting (interrupt) operation. Note that circuit 20 is but one of many methods for enabling the muting operation which could also be performed entirely within switching network 12 or within a switching network (not shown) between IVR 14 and ACD 17. Note also that in some embodiments where the original IVR actually disconnected the signals from sensitive keys 30 would cause the connection of a new IVR. This new IVR can be at the same location as the original IVR or can be located separately from the original IVR, perhaps even co-located with the ACD or the agents.

When the connection between the calling user and the ACD has been muted the IVR then prompts the caller to speak or key in the desired sensitive information. When the IVR receives the desired information from the calling user the IVR access the callers' records. This access can be accomplished any number of well-known ways. Note that by placing control 20 in front of IVR (instead of in parallel therewith) it is possible to also cut off the audio to the IVR, if desired.

Figure 4:
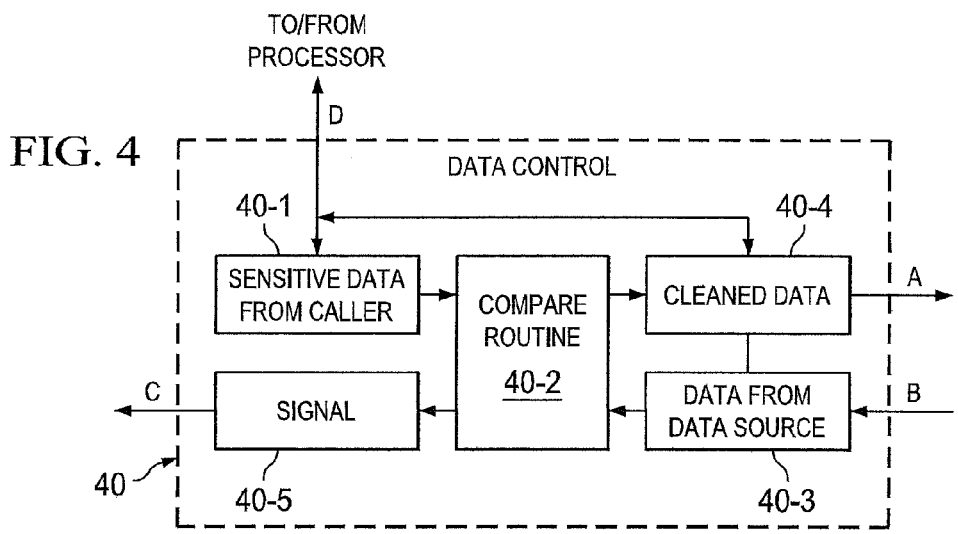

FIG. 4 illustrates one system using data control 40 for allowing the IVR to access the sensitive information from data source 18 and store the accessed information temporarily in buffer 40-3. The information from the user is temporarily stored in buffer 40-5. Compare routine 40-2, which could be a stand-alone comparison circuit, but preferably would reside in a processor, such as processor 140 or processor 18-1, determines if the provided information matches the stored information and if so a signal is provided to the IVR via signal circuit 40-5. The IVR then removes the mute circuit and passes on, or enables the conduit of the proper non-sensitive information to the connected agent. The connected agent then can resume his/her interaction with the calling user. Depending upon the embodiment, the IVR can then again remain silently bridged or drop off the connection.

The type of information passed to the agent from the IVR in response to the provision of the sensitive information could be a simple "yes" or "no" indicating, for example, that a PIN has been matched or that the credit card information has been received and is valid. In some situations, more complex data corresponding to the sensitive information might be sent from the IVR to the ACD, or the ACD agent might be given further access to data from a data source, such as data source 18 or some other data source. In some situations it may be appropriate for the IVR to run one or more multi-prompt scripts between itself and the calling user before removing the mute control. Also, the mute might be set up in such a manner, perhaps using 4-wire circuitry, such that the agent can actually hear the prompts to the calling user but can not hear the response back. Using this procedure it is possible to remove any desired sensitive information in the callers' record while still allowing the agent to process the call.

In another embodiment, instead of requiring the agent to use sensitive keys 30 the agent simply asks the user to provide the information. In this embodiment, the calling user would be instructed, whether by the IVR before being connected to the ACD, or by the agent, to use DTMF for transmitting any sensitive information. Under such a situation, the IVR would be equipped to detect DTMF, for example, by using DTMF detector 25 in circuit 20. Thus, when detector 25 "hears" the first tone on the line the mute control is enabled (as discussed above) and the IVR then records the information from the calling user. Once the information is received the IVR can continue with appropriate prompts, if desired, or can remove the mute and as discussed above, present the sanitized data to the agent.

Keeping the IVR in the audio path during the call also provides other benefits. With the IVR monitoring the audio, the application can give the caller, or the system, an option to record any portion of the agent discussion (or even the IVR portion of the call). If the calling user is to control the recording, or other services available from the IVR, then the calling user can be given a key or set of keys on the calling user's dialing pad to enable/disable the desired IVR function. The recording can be sent via email to the caller after the call completes. Processor 140 can control this function.

If, during the conversation with the agent, it is determined that the IVR can handle a specific task, the caller or agent can request that the agent be released from the call, and the caller returned to the IVR dialog to complete the task. This could be one of the features enabled by the caller or by the agent either of whom could enable the proper dialing key or set of keys.

Figure 5:
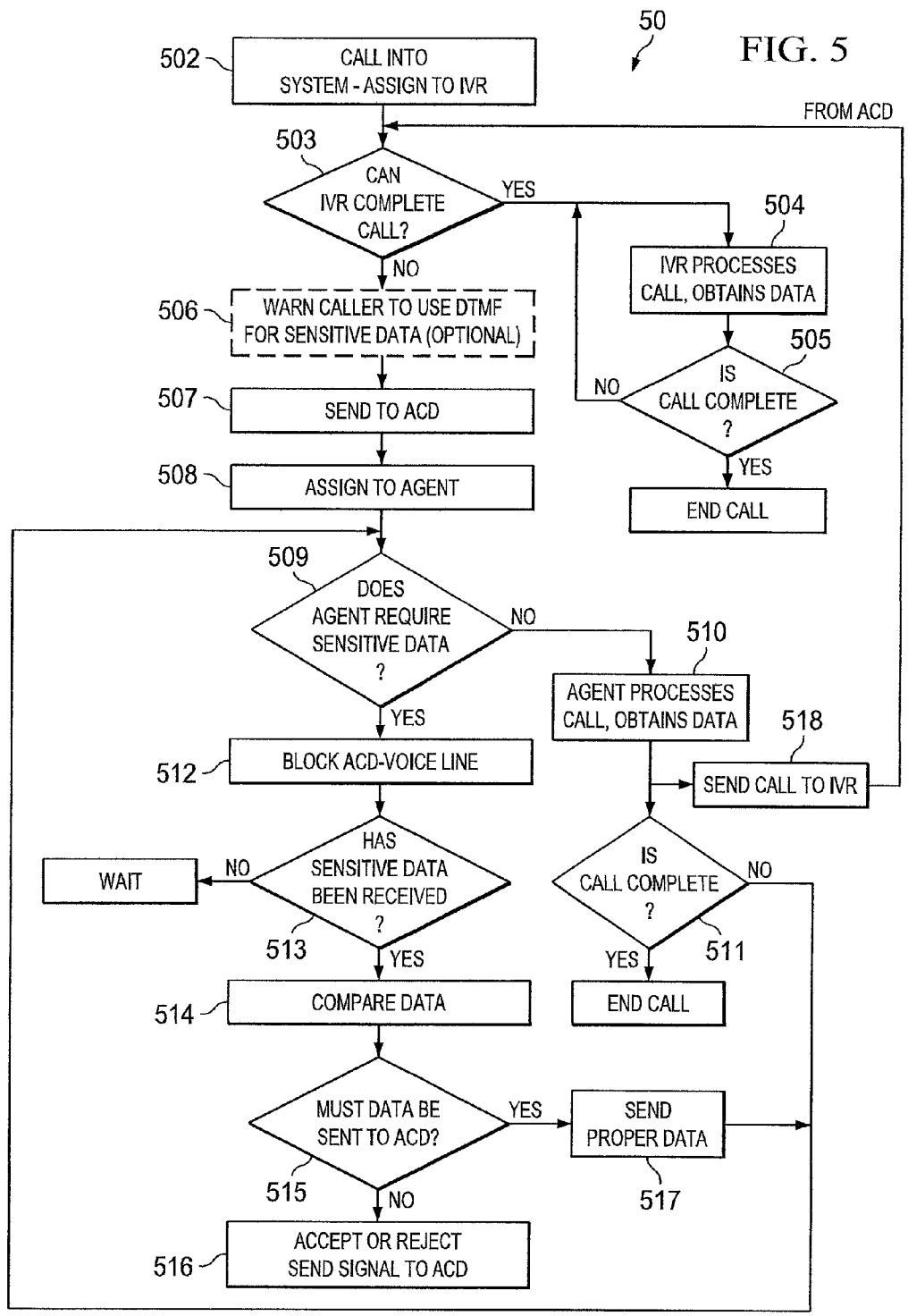
FIG. 5 shows one embodiment of a method for operating the system shown in FIG. 1.

FIG. 5 shows one embodiment 50 of a method for operating the system shown in FIG. 1. Process 501 accepts a call into the IVR system and assigns the calling user to an available IVR. Process 503 determines at what point, if any, the IVR can no longer handle the call without agent intervention. Until such a determination, process 504 processes the call and obtains whatever data the calling user desires, all in the well-known manner for IVR systems. When process 505 determines the call is complete it is ended.

When process 503 determines that the call must be routed to an ACD system, such to system 17, FIG. 1 (or to any other type of system) for assistance then process 506, optionally, warns the calling user that the call is being transferred and that any sensitive information should be entered using the user's key pad (DTMF). As discussed above, in some situations this will not be necessary since the IVR would have already muted the agent's voice path. Process 507 then sends the call to the ACD system or to some other system for further handling of the call. Depending upon the embodiment being used, the IVR may be disconnected but preferably would remain on a bridged connection with the ACD.

Process 508, usually running at the ACD system, then assigns an available agent to the connection. Process 509 determines if and when the agent requires sensitive information. Until such information is required, processes 510 and 511 proceed in the normal manner to allow the agent to dialog with the calling user and to obtain information from data source 18 all under control of processors 170 and 18-1.

When process 509 determines that sensitive data is required, process 512 operates to mute the line to the ACD so that the agent can not hear the sensitive data. As discussed above, this can be done in any of a number of ways. The original IVR could have remained on the line or a new IVR can be added. This can occur because the agent provided a signal to the IVR, via key box 30 or otherwise, or because the IVR detected DTMF or other signals on the voice line. Also, the line can be muted under control other than the IVR.

Process 513 waits for all of the sensitive data to be received and when it is all received then process 514 compares the received data against expected data. If a proper match is made but only the results must be communicated to the ACD, then an accept or reject signal is sent to the ACD by process 516. If more data is to be sent, or made available to the ACD then process 515 in conjunction with process 516 sends the proper data, or makes the data available to, the ACD. Both processes 516 and 517 terminate in the agent again taking charge of the calling connection.

In some situations, the agent may decide that the call should be returned for processing by an IVR. In such a situation, processes 510 and 518 send the call to the IVR system for subsequent completion.

Figure 6:
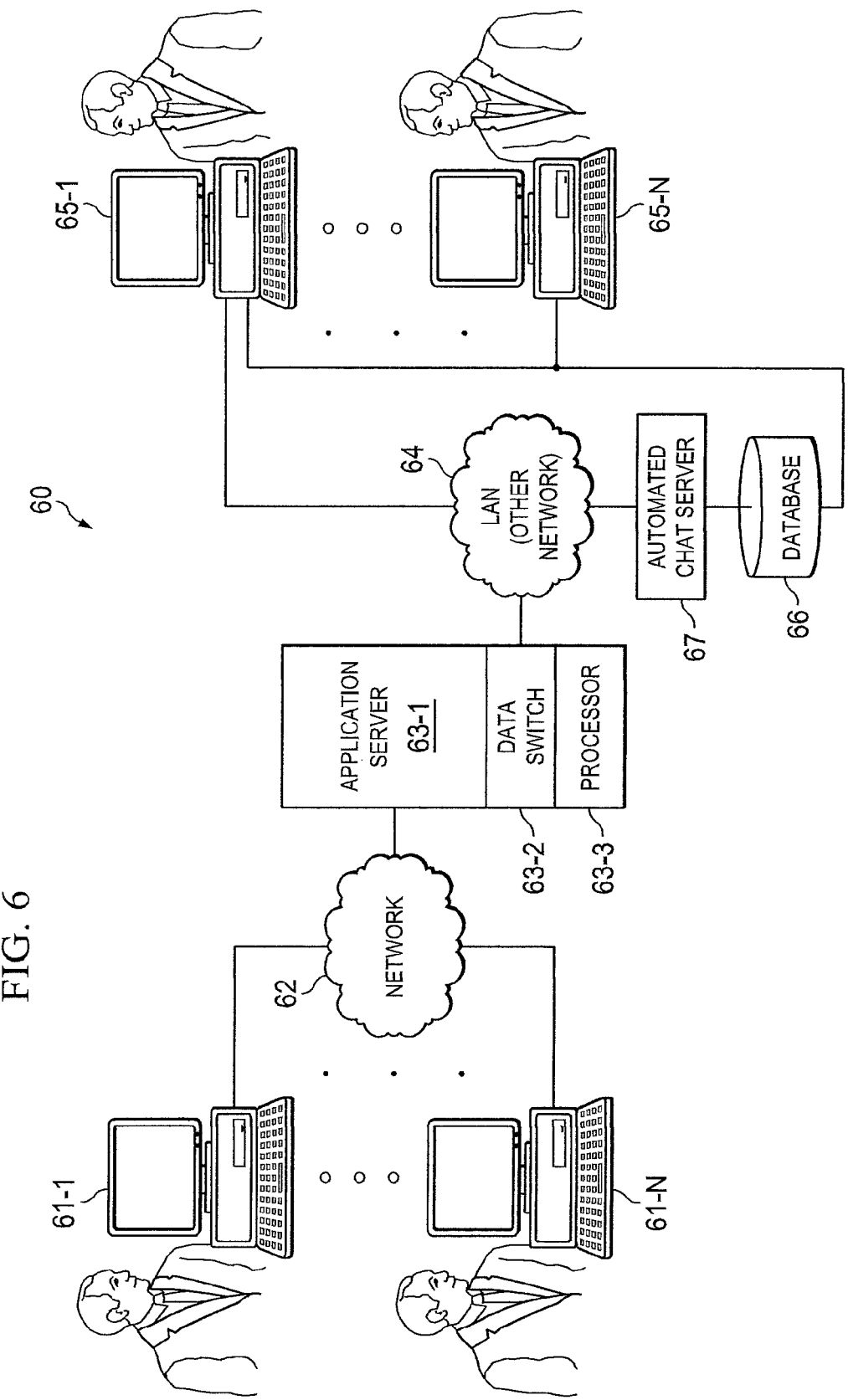
FIG. 6 shows one embodiment of a network chat system using the concepts of the invention.

FIG. 6 shows one embodiment 60 of a system in which the concepts discussed herein can be used during a network chat session. A user connects to the chat network from a terminal, such as from terminal 61-1, via network 62. Network 62 would ideally be a digital network, such as the Internet, and could be wireline or wireless or a combination thereof. In operation, terminal 61-1, or any one or more of terminals 61-1 through 61-N, would connect through the network to application server 63-1 and data switch 63-2 which in turn, connects the user to an agent selected from agent pool 65-1 to 65-N via network 64. Network 64 can be a LAN or a portion of network 62 or a combination thereof. This then allows the user at terminal 61-1 to text chat with an agent, such as agent 65-1. In one embodiment, LAN 64 is a dedicated network.

When sensitive information is required, for example, when the agent needs credit card information from the chat-user, the chat session is switched to an automated "chat bot", such as chat server 67. Such switch is controlled, at least in part, by data switch 63-2 operating under control, for example, of processor 63-3. Data switch 63-2 then directs the sensitive information to chat server 67 and database 66 while preventing the data from passing through network 64 to the agent. Data switch 63-2 can operate to keep agent 65-1 active on the connection but block, or encrypt, the information such that agent 65-1 can not receive the data in an intelligent format. Thus, in one embodiment, the data from user 61-1 can continue to flow to the connected agent but since the sensitive data is being encrypted in a manner such that only the chat server can intelligently use it, it is safe from theft or other misuse. For even greater security, the data can be prevented from passing to the agent for a period of time, or until the sending user signals, perhaps by a special key stroke, that he/she is finished sending sensitive data. A specific key stroke from the agent could, for example, be the trigger to block all data from the agent until a specific key stoke is received from the sending user.

After the sensitive data is delivered to the trusted intermediary, i.e. the chat server, the system then could allow other information pertaining to the sensitive date to be delivered to the agent. An example of this would be a verification of credit, or verification of a PIN, or a name associated with an account number, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A machine comprising:
   a. a communication router;
   b. a robotic interaction system; and
   c. a means for protecting sensitive information;
   wherein:
   i. the communication router is configured to enable an interaction between a user and an agent by establishing a connection between the user and the agent;
   ii. the robotic interaction system is configured to, during the interaction between the user and the agent, receive a response to a request, wherein:
      the request is provided to the user; and
      the request requests the user to provide sensitive information;
   iii. the means for protecting sensitive information is configured to prevent the response to the request from being communicated to the agent.

2. The machine of claim 1, wherein the communication router comprises an automatic call distribution system.

3. The machine of claim 1, wherein the communication router comprises a data switch.

4. The machine of claim 1, wherein the robotic interaction system comprises a chat bot.

5. The machine of claim 1, wherein the robotic interaction system comprises an interactive voice recognition system.

6. The machine of claim 1, wherein the means for protecting sensitive information comprises an interrupt circuit.

7. The machine of claim 6 wherein the means for protecting sensitive information consists of the interrupt circuit.

8. The machine of claim 1, wherein the means for protecting sensitive information comprises a processor configured to encrypt the response to the request.

9. The machine of claim 1, wherein the robotic interaction system is configure to:
   a. use a DTMF detector to detect sensitive information;
   b. invoke the means for protecting sensitive information based on the detection of sensitive information.

10. A method comprising:
    a. a non-secure agent engaging in bi-directional communication with a system user;
    b. inhibiting sensitive information from the system user from being communicated to the non-secure agent while being communicated to a trusted intermediary by performing acts comprising, during an interaction comprising the bi-directional communication, preventing a response from the system user to a request to provide sensitive information from being provided to the non-secure agent; and
    c. after inhibiting the sensitive information from said system user from being communicated to said non-secure agent while being communicated to said trusted intermediary, the non-secure agent resuming the interaction, wherein resuming the interaction comprises the non-secure agent engaging in further bi-directional communication with the system user.

11. The method of claim 10, wherein when, during the interaction, the non-secure agent requires access to data defined by sensitive information in the possession of said system user, the non-secure agent operates a sensitive information button from a plurality of sensitive information buttons.

12. The method of claim 11, wherein:
    a. the operated sensitive information button corresponds to the sensitive information in possession of the system user which defines the data the non-secure agent requires access to; and
    b. based on the operation of the sensitive information button corresponding to the sensitive information in possession of the system user which defines the data the non-secure agent requires access to, the trusted intermediary provides the system user the request to provide the sensitive information.

13. The method of claim 10, wherein:
    a. the request to provide the sensitive information and an additional request to provide sensitive information are provided to both the system user and the non-secure agent; and
    b. a response from the system user to the additional request to provide sensitive information is prevented from being provided to the non-secure agent.

14. The method of claim 10, wherein:
    a. a comparison is performed between the response from the system user to the request to provide the sensitive information and expected data; and
    b. a result of the comparison is provided to the non-secure agent for use in the further bi-directional communication with the system user.

15. The method of claim 10, wherein the response from the system user to the request to provide sensitive information is prevented from being provided to the non-secure agent via a means for protecting sensitive information.

* * * * *